Figure 1:
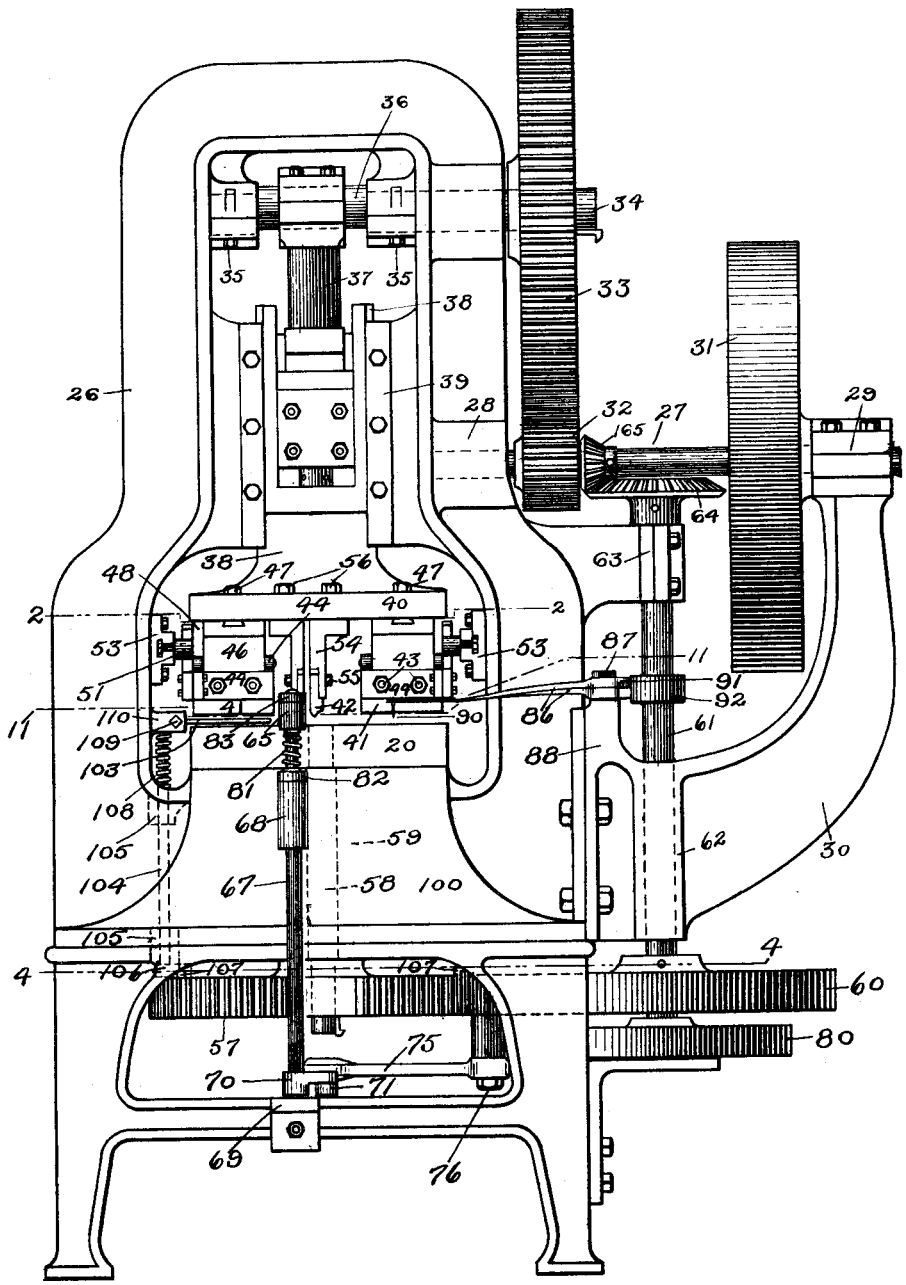

No. 675,950. Patented June 11, 1901.
G. O. JENKINS.
MACHINE FOR CUTTING AND FORMING LEATHER BOARD SHOE SHANKS.
(Application filed Feb. 20, 1901.)
(No Model.) 7 Sheets—Sheet 1.

WITNESSES:

INVENTOR:
George O. Jenkins.
by his Attorney

No. 675,950. Patented June 11, 1901.
G. O. JENKINS.
MACHINE FOR CUTTING AND FORMING LEATHER BOARD SHOE SHANKS.
(Application filed Feb. 20, 1901.)
(No Model.) 7 Sheets—Sheet 2.

WITNESSES:

INVENTOR:
George O. Jenkins.
by his Attorney

No. 675,950. Patented June 11, 1901.
G. O. JENKINS.
MACHINE FOR CUTTING AND FORMING LEATHER BOARD SHOE SHANKS.
(Application filed Feb. 20, 1901.)
(No Model.) 7 Sheets—Sheet 3.

WITNESSES: INVENTOR:
George O. Jenkins.
by his Attorney
Charles S. Gooding

No. 675,950. Patented June 11, 1901.
G. O. JENKINS.
MACHINE FOR CUTTING AND FORMING LEATHER BOARD SHOE SHANKS.
(Application filed Feb. 20, 1901.)
(No Model.) 7 Sheets—Sheet 4.

WITNESSES:
Henry Marsh
George A. Tarbell

INVENTOR:
George O. Jenkins.
by his Attorney
Charles V. Gooding

No. 675,950. Patented June 11, 1901.
G. O. JENKINS.
MACHINE FOR CUTTING AND FORMING LEATHER BOARD SHOE SHANKS.
(Application filed Feb. 20, 1901.)
(No Model.) 7 Sheets—Sheet 5.
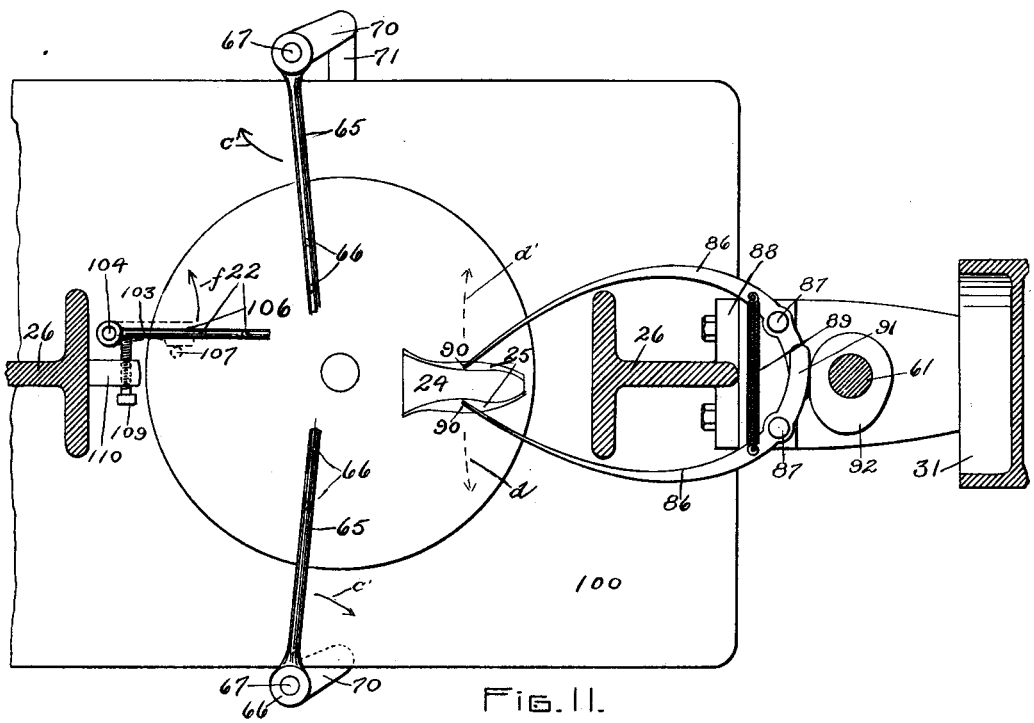
Fig. 11.
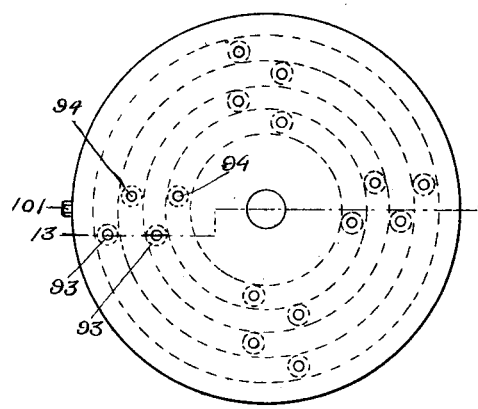
Fig. 12.
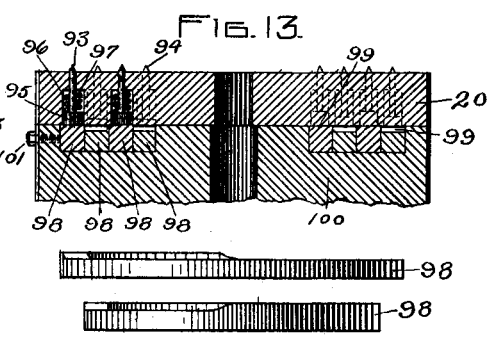
Fig. 13.
Fig. 14.
WITNESSES:
F. Henry Marsh.
George A. Tarbell.
INVENTOR:
George O. Jenkins.
by his Attorney
Charles N. Goodwin.

No. 675,950. Patented June 11, 1901.
G. O. JENKINS.
MACHINE FOR CUTTING AND FORMING LEATHER BOARD SHOE SHANKS.
(Application filed Feb. 20, 1901.)
(No Model.) 7 Sheets—Sheet 6.

No. 675,950. Patented June 11, 1901.
G. O. JENKINS.
MACHINE FOR CUTTING AND FORMING LEATHER BOARD SHOE SHANKS.
(Application filed Feb. 20, 1901.)
(No Model.) 7 Sheets—Sheet 7.

WITNESSES:

INVENTOR:
George O. Jenkins
by his Attorney

UNITED STATES PATENT OFFICE.

GEORGE O. JENKINS, OF WHITMAN, MASSACHUSETTS.

MACHINE FOR CUTTING AND FORMING LEATHER-BOARD SHOE-SHANKS.

SPECIFICATION forming part of Letters Patent No. 675,950, dated June 11, 1901.

Application filed February 20, 1901. Serial No. 48,146. (No model.)

*To all whom it may concern:*

Be it known that I, GEORGE O. JENKINS, a citizen of the United States, residing at Whitman, in the county of Plymouth and State of Massachusetts, have invented new and useful Improvements in Machines for Cutting and Forming Leather-Board Shoe-Shanks, of which the following is a specification.

This invention relates to machines for cutting and forming articles of curvilinear outline from sheet material, and is particularly adapted to cutting and forming leather-board shoe-shanks from a strip of leather-board of a width equal to the length of the shoe-shank.

The object of the invention is to produce a machine which will cut two or more articles of curvilinear outline and form the said articles after cutting them from the sheet material.

The object of the machine is further and particularly to cut said articles from the sheet material with the least possible amount of waste of said material.

The invention consists in mechanism for cutting simultaneously two pieces of curvilinear outline from a strip of sheet material, one of said pieces of the outline desired, and mechanism whereby the other of said pieces is carried to a cutting mechanism, which cutting mechanism cuts another article of the curvilinear outline desired therefrom.

The invention again consists in mechanism whereby said articles of sheet material after having been cut to the outline desired are carried to a forming mechanism and there formed to give the edges a rounded bevel at an angle with the surface of said shank.

The invention still further consists in the combination and arrangement of parts set forth in the following specification and particularly pointed out in the claims thereof.

Figure 2:
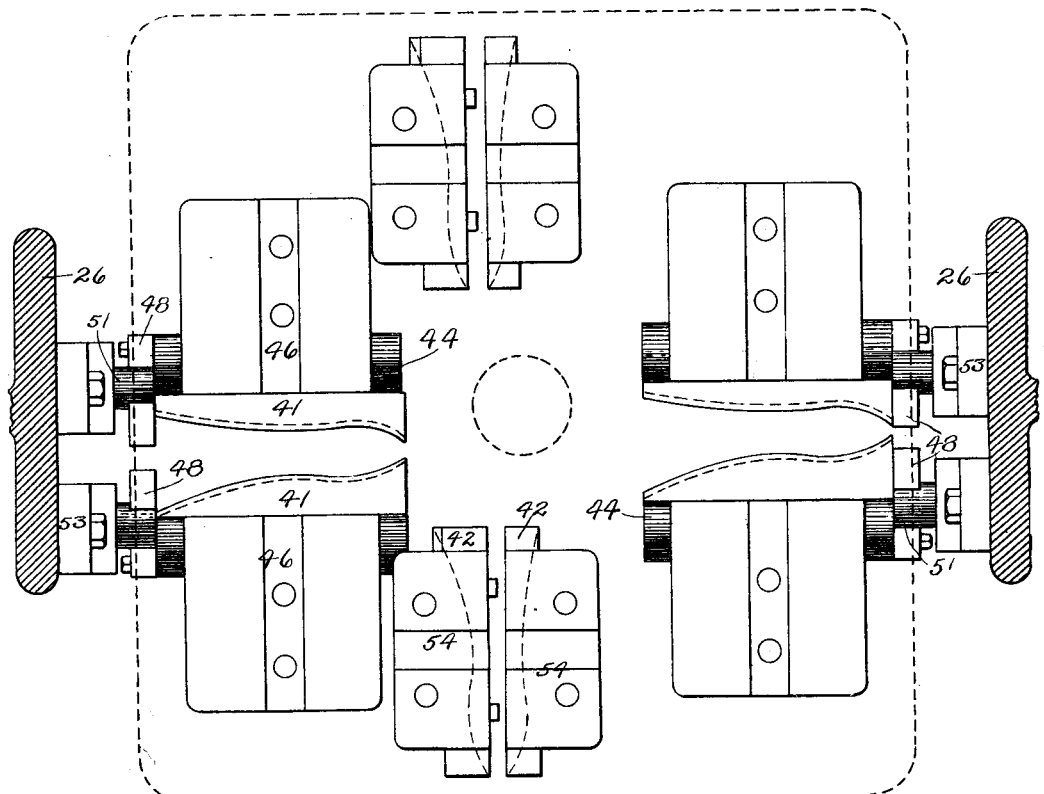
Figure 3:
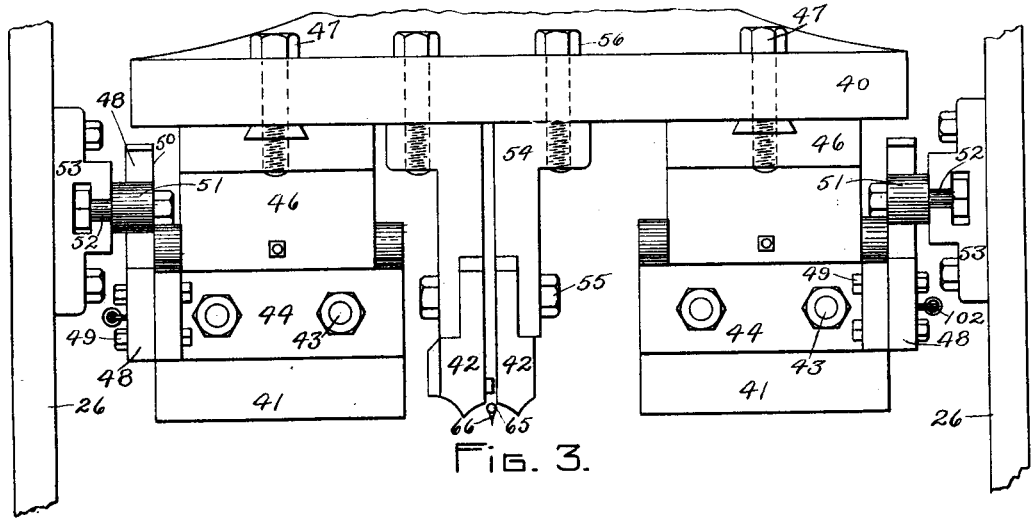
Figure 4:
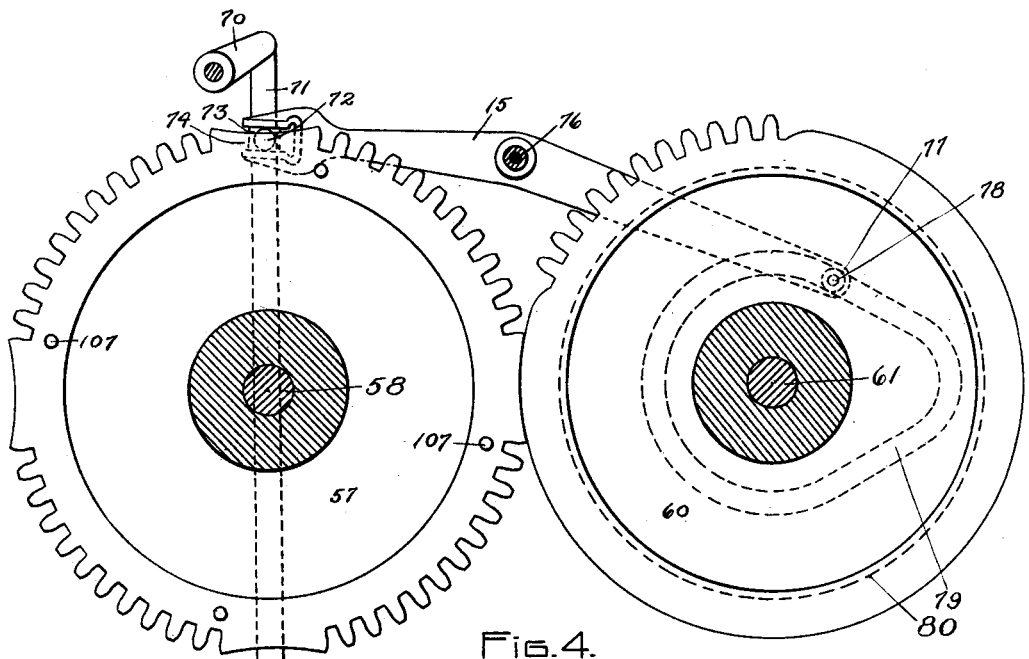
Figure 5:
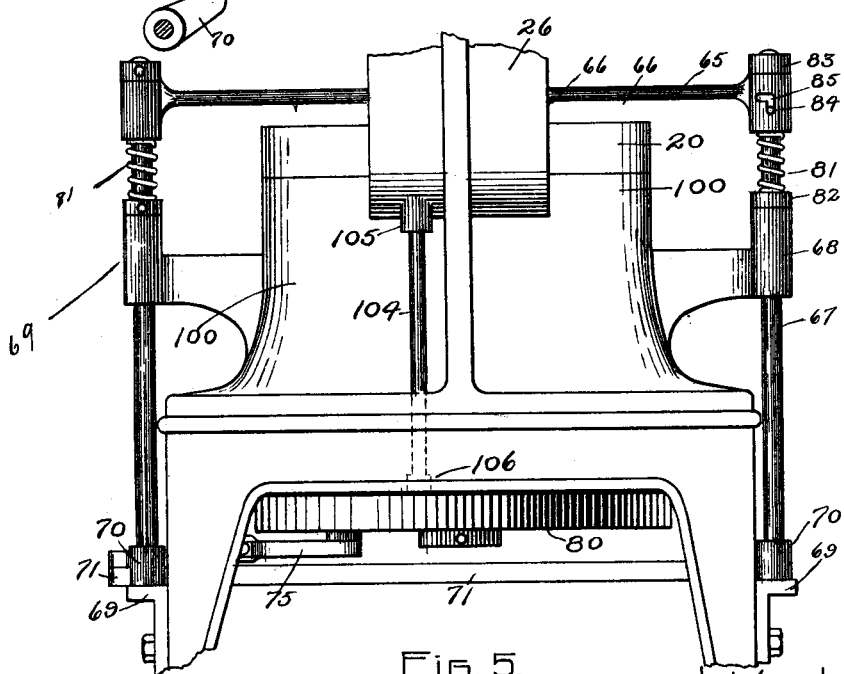
Figure 6:
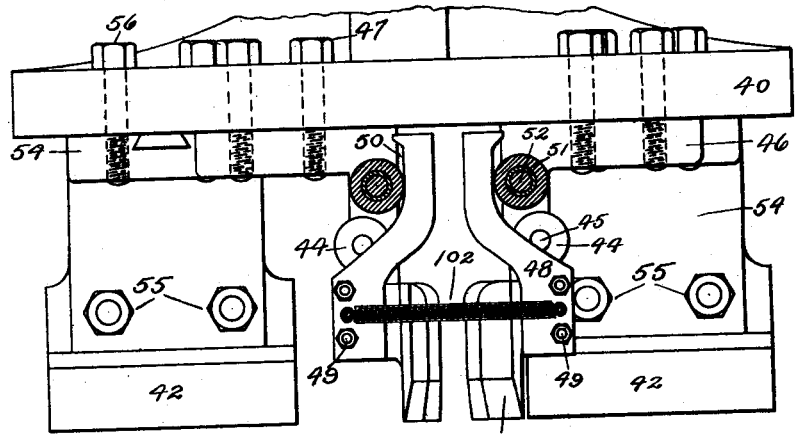
Figure 15:
Figure 15:
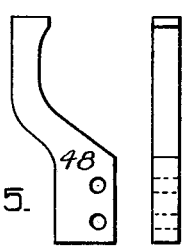
Figure 16:
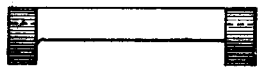
Figure 16:
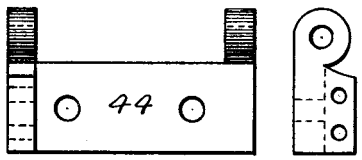
Figure 19:
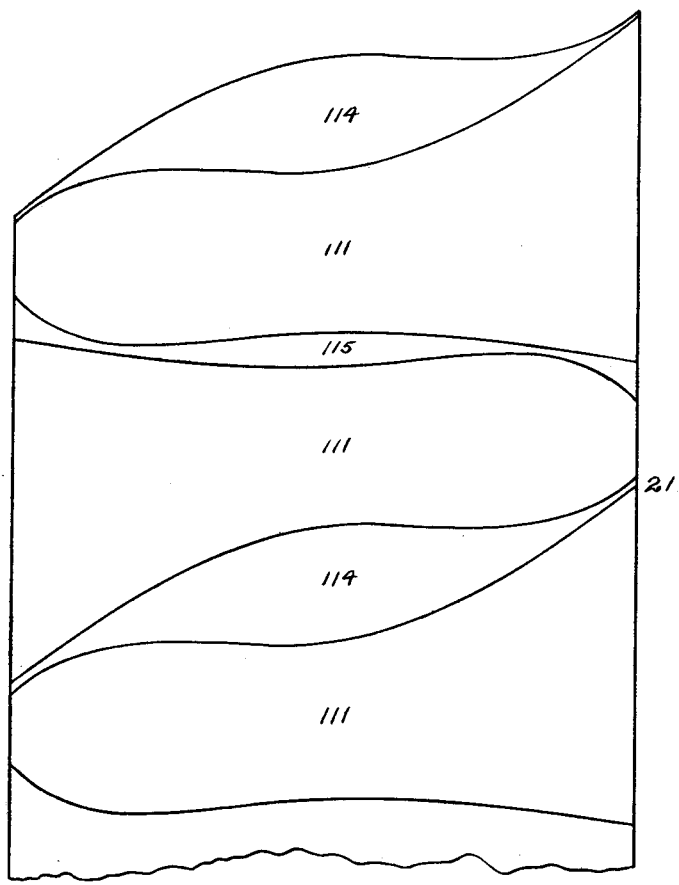
Figure 17:
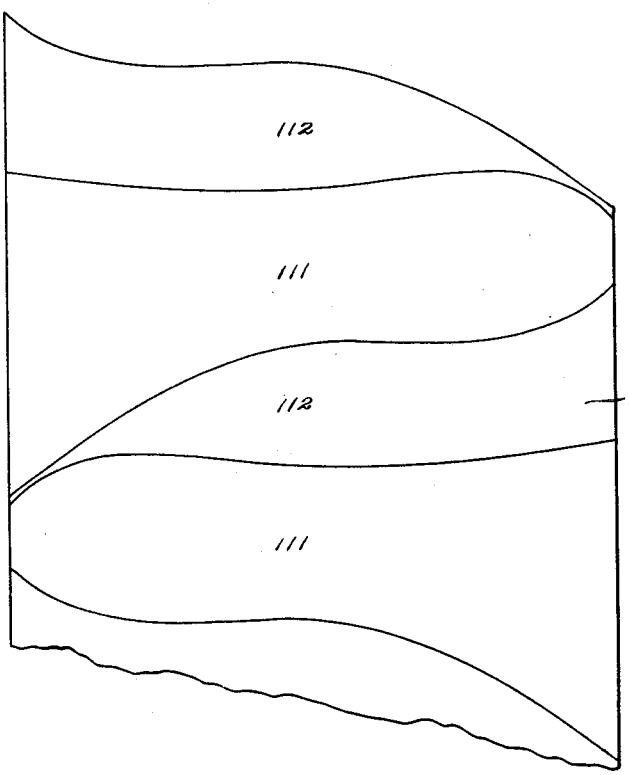
Figure 18:
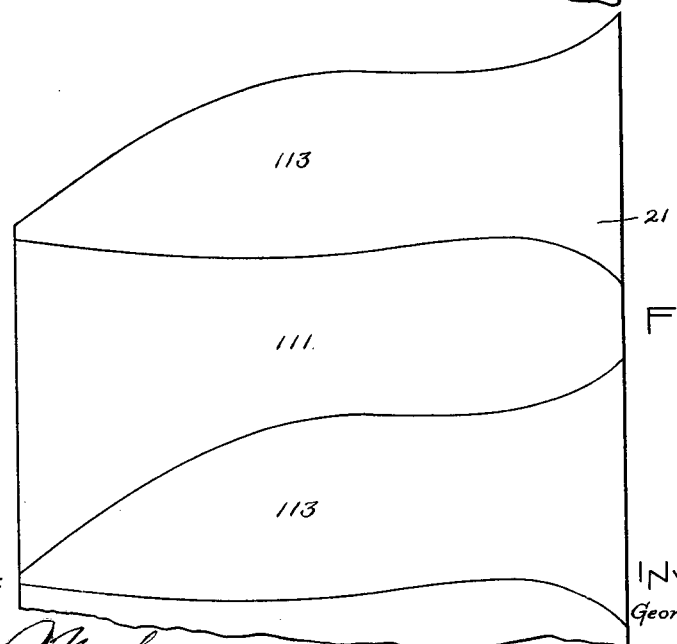

Referring to the drawings, Figure 1 is a front elevation of my improved shoe-shank machine. Fig. 2 is an enlarged plan section taken on the line 2 2 of Fig. 1. Fig. 3 is a front elevation of the parts shown in Fig. 2. Fig. 4 is an enlarged plan section taken on line 4 4 of Fig. 1, showing the intermittent gears and mechanism for removing the completed shanks from the machine. Fig. 5 is a side elevation, taken from the left of Fig. 1, of a portion of the machine, showing the mechanism for removing the finished shoe-shanks therefrom. Fig. 6 is a side elevation, taken from the left of Fig. 1, of the mechanism for cutting and forming the shoe-shanks. Figs. 7, 8, 9, and 10 are diagram views illustrating the method of cutting shoe-shanks from a strip and forming said shoe-shanks. Fig. 11 is a detail plan section taken on line 11 11, Fig. 1, showing the mechanism for removing the waste material from the cutting-plate. Fig. 12 is a plan view of the cutting-plate, the cam-plates which operate the retaining-pins being shown in dotted lines. Fig. 13 is a section taken on line 13 13, Fig. 12. Fig. 14 is a side elevation of two of the cam-plates for operating the retaining-pins. Fig. 15 shows detail views of the knife-actuating cam-plate. Fig. 16 shows detail views of the oscillating knife-holder. Figs. 17 to 19 are diagram views.

Like characters refer to like parts throughout the several views of the drawings.

In the drawings the general principle of operation of the machine hereinafter described is illustrated by the diagram views, Figs. 7 to 10, inclusive. Each of these figures shows the cutting-table 20 in plan view.

Figure 8:
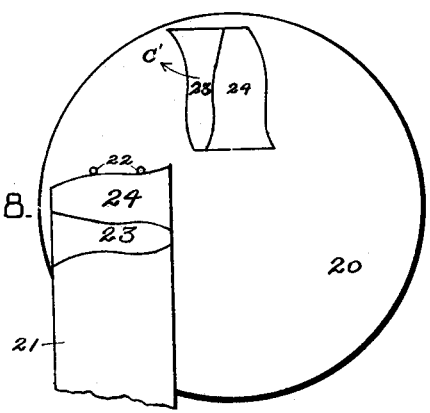
Figure 7:
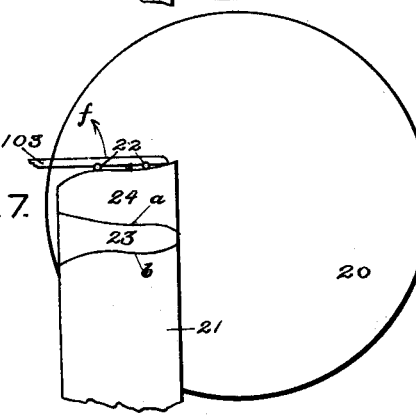
Figure 10:
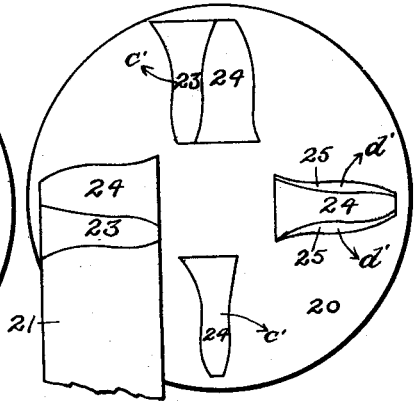

The shoe-shanks are cut from a strip of sheet material, preferably leather-board, of a width equal to the length of the shoe-shank. In Fig. 7 the leather-board strip 21 is shown placed upon the cutting-table 20 with the end of the strip bearing against the two gage-pins 22 22, and in this position the cutting-knives descend and cut a shoe-shank 23 from the strip 21 on the lines *a b*. The portion 24 of the leather-board strip between the line *a* of the shoe-shank 23 and the end of said strip is of a surface sufficient to enable a second shoe-shank to be cut therefrom after said portion 24 has been carried beneath another cutting mechanism. In Fig. 8 the portion 24 and the shoe-shank 23 have been carried beneath the shoe-shank-forming dies, the table 20 having been given a rotation of ninety degrees and the leather-board strip 21 having been fed forward by hand until the end thereof rests against the gage-pins 22 22. The cutting-knives at the left of the cutting-table again descend and cut a new shank and waste portion from the leather-board strip. At the same time the shoe-shank 23 is formed by the forming-dies. The cutting-table is now given another quarter-rotation and the portion 24 is brought to the position shown in Fig. 9, the shank 23 having been removed from the cutting-table during this last quarter-rotation. The knives at the left of the cutting-table and the forming-dies at the back of the table, together with another pair of cutters at the right of the table or on the third quarter thereof, descend, repeating the operations hereinbefore described and cutting the portion 24 to the shape of a shoe-shank along the lines c d, leaving waste portions 25 25, which are subsequently removed as the table turns to the fourth quarter, where the shank 24 is formed and subsequently removed by mechanism hereinafter described. It will therefore be seen that upon the first descent of the cutting-knives and forming-dies the shank 23 is cut out and is carried to the second quarter, together with the portion 24. At the second quarter the shank 23 is formed and removed from the machine and the portion 24 carried to the third quarter, where a shank is cut out of said portion and the waste portions removed, said shank 24 finally being carried to the fourth quarter, where it is formed by forming-dies. It will be understood that after the cutting-table has made one rotation the two pairs of cutting-knives will at each rotation of the eccentric shaft cut out a shank on the first and third quarters of the cutting-table and that the forming-dies will each form a shank on the second and fourth quarters of said cutting-table. The mechanism by which these various steps are accomplished is hereinafter fully set forth and described.

26 is the frame of the machine; 27, the driving-shaft, which rotates in a bearing 28 upon the frame of the machine and in a bearing 29 upon a bracket 30, fast to said frame. The driving-shaft is rotated by a pulley 31, preferably a clutch-pulley of any suitable construction, and has a pinion-gear 32 fast thereto, which meshes with a gear 33, fast to a crank-shaft 34, which rotates in capped bearings 35 upon the frame of the machine.

The crank 36 is connected by a connecting-link 37 to a slide 38, which is guided in ways 39 on the frame of the machine. Upon the lower end of the slide 38 is a plate 40, integral with said slide, to which, upon the under side thereof, are attached the cutting-knives 41 and the forming-dies 42. Each of the knives 41 is fastened by bolts 43 to an oscillating holder 44, pivoted at 45 to a slide 46. The slide 46 is adjustably fastened to the plate 40 by bolts 47. As the plate 40 is carried up and down by the slides 38 it carries the knives 41, oscillating holders 44, and slides 46 with it. Said knives descend in a straight line until just as the cutting edges thereof strike the upper surface of the sheet material or leather-board strip 21. Said knives are then given a sidewise motion in order to cut the edge of the shoe-shanks upon a bevel, and this sidewise motion is attained by tipping the knives 41 and their holders 44 upon the pivot 45. This tipping motion is produced by a cam-plate 48, which is fastened to the oscillating holder 44 by screws 49. The cam-shaped edge 50 of each of the plates 48 bears against a roll 51, adjustably fastened by a cam-stud 52 to a slotted plate 53, fast to the frame of the machine. The cam-shaped edges 50 of the cam-plates 48 are kept in contact with the rolls 51 by a spiral tension-spring 102, fast at each end to one of said cam-plates. The rolls 51 being stationary on the machine, as the cam-plates and knives descend from the position shown in Fig. 6 until the upper portion of said cam-shaped edge encounters the roll 51 and force said cam-plates toward each other it causes the knives 41, which are below said pivot, to move outwardly from each other, the cutting edges thereof descending at the same time and the resultant cut of the edge of the shank being on a bevel or angle with the surface thereof.

The forming-dies 42 are attached to holders 54 by bolts 55, and said holders are in turn fastened adjustably to the plate 40 by screws 56. Said forming-dies are rigidly attached to the plate 40 and are shaped upon their lower and inner sides of the desired contour to form the bevel edge of the shoe-shank upon a curve at an angle with the surface thereof.

An intermittent rotary motion is imparted to the cutting-table 20 by an intermittent gear 57, fast to the lower end of a vertical shaft 58, having a bearing 59 in the frame of the machine and having the cutting-table 20 fast to the upper end thereof. The intermittent gear 57 is driven by another intermittent gear, 60, fast to a vertical shaft 61, having bearings 62 63 in the bracket 30 and frame 26, respectively. Said shaft 61 is rotated by a bevel-gear 64, which meshes with a bevel-pinion 65, fast to the main driving-shaft 27. The driving-shaft 27 rotates four times while the vertical shaft 61 rotates once, and the pinion 32 rotates four times in order to rotate the gear 33 and the crank-shaft 34 once, so that at each rotation of the intermittent gear 60 the slide 38 and the cutting-knives and forming-dies thereon will make one motion up and down. The intermittent gear 60 at each rotation thereof turns the intermittent gear 57 a quarter of one rotation and the cutting-table 20 a corresponding amount. It therefore follows that the slide 38 makes one motion up and down to each quarter-rotation of the cutting-table 20.

The mechanism for removing the completed shanks from the cutting-table is illustrated in detail in Figs. 4 and 5 and in front elevation in Fig. 1. Said mechanism consists of a pair of arms 65, having pins 66 upon the under side thereof and each of them being pivoted to a vertical rocker-shaft 67. Said rocker-shaft rocks in bearings 68 69, fast to the frame of the machine, and has fastened to the lower end thereof an arm 70. The arms 70 are connected together by a link 71, having a stud 72 and sliding block 73 attached thereto, said sliding block engaging a slot 74 in the end of the cam-lever 75. Said cam-lever is pivoted to a stud 76, fast to the frame of the machine. A cam-roll 77 turns upon a stud 78, fast to said lever 75, and engages a cam-path 79 in a cam 80, fast to the lower end of the vertical shaft 61. Each of the arms 65 is supported by a spiral spring 81, which encircles the shaft 67, the lower end thereof bearing against a collar 82, fast to said shaft. Another collar, 83, upon the upper end of the shaft 67 and fast to said shaft forms a stop to limit the distance to which said arm 65 can be raised upon the shaft 67 by the spring 81. A pin 84, fast to the shaft 67, engages a right-angled slot 85 in the hub of the arm 65.

The operation of the mechanism for removing the finished shoe-shanks from the cutting-table is as follows: Said shoe-shanks are removed from the table at the second and fourth quarters after the forming-dies have performed their function. Assuming the arms 65 to be in the position shown in Figs. 5 and 11, the forming-dies, descending, force the arms 65 downwardly upon the shaft 67 and the pins 66 into the shoe-shank which at that time rests beneath them upon the cutting-table 20. The arms 65 descend, as hereinbefore described, until the pin 84 comes opposite the horizontal portion of the right-angled slot 85. The cam 80 next imparts a rocking motion to the arms 70 through the link 71, thus bringing the pin 84 into the horizontal portion of the slot 85 until it arrives at the end of said horizontal portion, when the arm 65 and rocker-shaft 67 will move together in the direction of the arrows $c'$, Fig. 11. The pins 66 being inserted in the shoe-shanks, it is evident that both shoe-shanks will be swept from the cutting-table by the said rocking motion of the arm 65. Upon the return movement of the arms 65 for the purpose of removing another shoe-shank from the cutting-table the rocking shaft 67 will be turned in the opposite direction to the arrow $c'$, Fig. 11, by the cam 80 and intermediate connections until the pin 84 passes out of the horizontal portion of the slot 85 in line with the vertical portion thereof, whereupon the spring 81 will force the hub of the arm 65 upwardly against the collar 83, and a continued motion of the rocker-shaft 67 in the same direction will carry said arm 65 by means of the pin 84 back into the position shown in Figs. 4 and 11 in readiness to repeat the operation of removing a shoe-shank, hereinbefore described.

Figure 9:
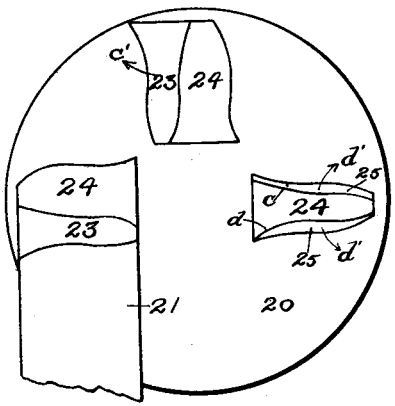

To remove the waste portions 25 25 of the leather-board, Fig. 9, I provide two spring-levers 86, pivoted at 87 to the frame of the machine and held normally against the stop 88 upon the bracket 30 by a spiral spring 89. Each of the levers 86 is provided with a downwardly-projecting point 90, which is forced into the waste portions 25 upon the descent of the knives, and each of them has a tail-piece 91, which bears against the cam 92, fast to the shaft 61, so that at each rotation of said shaft 61 the pointed ends thereof are thrown outwardly in the direction of the arrows $d'$, Fig. 11, thus removing the waste portions 25 from the cutting-table and allowing the shank 24 to be carried upon the next quarter-rotation of the cutting-table from the third quarter to the fourth in readiness to be formed by the forming-dies 42.

In order to hold the shank 23 and the portion 24 in position upon the cutting-table 20 during the several operations hereinbefore described, I provide pins 93, which enter the shank 23, and pins 94, which enter the portion 24, said pins projecting upwardly to a slight distance above the upper surface of the cutting-table 20 and having heads 95 formed thereon and adapted to slide vertically in a recess 96, formed in the under side of said cutting-table. A spiral spring 97 bears against the upper side of said head 95 and holds the same in contact with an annular ring 98. The annular rings 98 are four in number and are held in an annular recess 99, formed in the upper surface of the table-support 100, upon the frame 26 by a set-screw 101. The upper surface of said annular rings is cam-shaped, being cut away at such portions thereof as may be necessary in order to allow the springs 97 to force the pins 93 and 94 downwardly and out of engagement with the shoe-shank 23 and portion 24 at the proper time to allow said shoe-shank 23 and the shoe-shank which is formed from the portion 24 to be removed from the cutting-table, as hereinbefore described. The pins 93 93 remain above the surface of the table 20 until the shoe-shank 23 has passed to the second quarter and are forced downwardly by the springs 97 as the cutting-table starts to move from the second to the third quarter and just preceding the time when the arms 65 are rocked, as hereinbefore described, to remove the shoe-shank from the cutting-table. The pins 93 remain in their lowered position until just before arriving at the first quarter, or for about three-quarters of the rotation of the cutting-table 20. The pins 94 remain in the raised position until arriving at the third quarter, when they are lowered by said springs to allow the shank 24 to be removed, as hereinbefore described.

The general operation of the mechanism hereinbefore described as a whole is as follows: A strip of leather-board is placed by hand upon the upper surface of the cutting-table 20, with the end thereof in engagement with the gage-pins 22. The cutting-knives descend, being carried by the slide 38, and cut out the shank 23. The cutting-table 20 then takes a quarter-turn from the position shown in Fig. 7 to that shown in Fig. 8. The cutting-knives and forming-dies again descend, repeating the operation of cutting a shank at the first quarter and forming a shank 23 at the second quarter. Upon the ascent of the knives and forming-dies the cutting-table starts to move to the third quarter, the shank 23 is removed by the mechanism hereinbefore described, and upon arriving at the third quarter the cutting-knives again descend, cutting out the shank 24 and forming another shank at the second quarter and cutting out a third shank at the first quarter. Upon the next ascent of the knives and forming-dies the waste portions 25 at the third quarter are removed from the surface of the cutting-table, and the cutting-table taking its fourth quarter-rotation brings the shank 24 to the fourth quarter, where it is formed, the cutting-knives at the first and second quarters each cutting a new shank and the forming-dies at the second quarter forming another shank.

The hereinbefore-described operation of the machine pertains to the first four rotations of the crank-shaft when the machine is first started up and the strip of leather-board is fed therein. It is evident that subsequent rotations of the crank-shaft will cut two shanks at each rotation of said crank-shaft and form two shanks at the same time; also, that two shanks will be removed from the surface of the cutting-table—viz., at the second and fourth quarters, Fig. 10—and two waste portions of the sheet material will be removed from said cutting-table at the third quarter, Fig. 10.

The gage-pins 22 are fast to a rocker-arm 103. Said rocker-arm is fast to a vertical rock-shaft 104, which rocks in bearings 105 upon the frame 26 of the machine. An arm 106 is fastened to the lower end of the rock-shaft 104 and is rocked, together with said rock-shaft and arm 103, by pins 107, fast to the upper side of the intermittent gear 57. A torsional spiral spring 108 encircles the upper end of the rock-shaft 104, one end of said spring bearing against the arm 103 and the other end against the frame 26 of the machine. The arm 103 bears against an adjusting-screw 109, screw-threaded in an ear 110 upon the frame of the machine.

The operation of the hereinbefore-described device for removing the gage-pins from the path of the shank 23 and portion 24 when the cutting-plate starts to rotate is as follows: The intermittent gear 57, rotating with the cutting-plate 20, carries one of the four pins 107 against the rocker-arm 106 and rocks said arm, together with the shaft 104 and the arm 103, in the direction of the arrow $f$, Fig. 11, taking the gage-pins 22 out of the path of the shank 23 and portion 24 until the pin 107 has passed by the end of the arm 106, when the parts will be returned to the position shown in Fig. 11 by the torsional spiral spring 108 coming to a stop against the adjusting-screw 109. If it is desired to change the location of the gage-pins with relation to the cutting-table on account of a different width of shanks, the adjusting-screw 109 is turned to the right or left, moving the gage-pins 107 backward or forward, Fig. 11, respectively.

In Figs 17, 18, and 19 I have illustrated by diagram views different methods of cutting shoe-shanks from strips of leather-board for the purpose of illustrating the comparative waste of said leather-board. In Fig. 17 the leather-board strip 21 is cut by a single pair of reciprocatory knives and the strip is reversed at each cut of said knives. 111 111 are the shanks obtained by this method of cutting, and 112 the waste. In Fig. 18 I have illustrated the leather-board strip 21 as it appears when shanks 111 111 are cut therefrom by reciprocating knives, the leather-board strip being fed into the machine without reversing the same, 113 113 showing the waste of material in this case. In Fig. 19 I have illustrated a leather-board strip 21 as it appears when cut by the machine of this invention, in which 111 111 are the shanks, and 114 115 the waste pieces.

It will be easily seen by comparison of the three different methods illustrated that the waste of leather-board by the machine of this invention is much less than that shown in Figs. 17 and 18.

A side gage (not shown in the drawings) is used to keep the leather-board strip straight as it is fed into the machine by hand.

Having thus described my invention, what I claim, and desire to secure by Letters Patent, is—

1. A machine for cutting articles of curvilinear outline from sheet material, comprising a cutting-table, two sets of reciprocatory cutting-knives, mechanism to force one of said sets of cutting-knives through said sheet material and sever two pieces of material therefrom, one of said pieces of the curvilinear outline desired, mechanism to carry the other of said pieces of material beneath the second set of knives, and mechanism to force said second set of knives through said other piece of material and cut a second article of the curvilinear outline desired therefrom.

2. A machine for cutting articles of curvilinear outline from sheet material, comprising a cutting-table, two sets of reciprocatory cutting-knives, mechanism to force one of said sets of cutting-knives through said sheet material and sever two pieces of material therefrom, one of said pieces of the curvilinear outline desired, and mechanism to impart an intermittent rotary motion to said cutting-table.

3. A machine for cutting and forming shoe-shanks from sheet material, comprising a cutting-table, two sets of reciprocatory cutting-knives, two reciprocatory formers, said knives and formers located above said cutting-table and arranged to operate alternately upon sheet material placed upon said cutting-table, first cutting said shoe-shanks from said material and subsequently forming said shoe-shanks.

4. A machine for cutting articles of curvilinear outline from sheet material, comprising a cutting-table, two sets of reciprocatory cutting-knives, mechanism to force one of said sets of cutting-knives through said sheet material and sever two pieces of material therefrom, one of said pieces of the curvilinear outline desired, mechanism to carry the other of said pieces of material beneath the second set of knives, mechanism to force said second set of knives through said other piece of material and cut a second article of the curvilinear outline desired therefrom, and mechanism to remove said articles of the curvilinear outline desired from said cutting-table.

5. A machine for cutting articles of curvilinear outline from sheet material, comprising a cutting-table, two sets of reciprocatory cutting-knives, mechanism to force one of said sets of cutting-knives through said sheet material and sever two pieces of material therefrom, one of said pieces of the curvilinear outline desired, mechanism to carry the other of said pieces of material beneath the second set of knives, mechanism to force said second set of knives through said other piece of material and cut a second article of the curvilinear outline desired therefrom, and mechanism to remove the waste portions of said material from said cutting-table.

6. A machine for cutting articles of curvilinear outline from sheet material, comprising a cutting-table, two sets of reciprocatory cutting-knives, mechanism to force one of said sets of cutting-knives through said sheet material and sever two pieces of material therefrom, one of said pieces of the curvilinear outline desired, mechanism to impart an intermittent rotary motion to said cutting-table, and mechanism to remove said piece of the curvilinear outline desired from said cutting-table.

7. A machine for cutting articles of curvilinear outline from sheet material, comprising a cutting-table, two sets of reciprocatory cutting-knives, mechanism to force one of said sets of cutting-knives through said sheet material and sever two pieces of material therefrom, one of said pieces of the curvilinear outline desired, a reciprocatory former, mechanism to impart an intermittent rotary motion to said cutting-table and thereby carry said piece of the curvilinear outline desired from said reciprocatory cutting-knives to said former.

8. A machine for cutting articles of curvilinear outline from sheet material, comprising a cutting-table, two sets of reciprocatory cutting-knives, mechanism to force one of said sets of cutting-knives through said sheet material and sever two pieces of material therefrom, one of said pieces of the curvilinear outline desired, a reciprocatory former, mechanism to impart an intermittent rotary motion to said cutting-table and thereby carry said piece of the curvilinear outline desired from said reciprocatory cutting-knives to said former, and mechanism to remove said piece of the curvilinear outline desired from said cutting-table after the same is formed.

9. A machine for cutting and forming shoe-shanks from sheet material, comprising a cutting-table, two sets of reciprocatory cutting-knives, two reciprocatory formers, said knives and formers located above said cutting-table and arranged to operate alternately upon sheet material placed upon said cutting-table, first cutting said shoe-shanks from said material and subsequently forming said shoe-shanks, and mechanism to remove said shoe-shanks from said cutting-table.

10. A machine for cutting and forming shoe-shanks from sheet material, comprising a cutting-table, two sets of reciprocatory cutting-knives, two reciprocatory formers, said knives and formers located above said cutting-table and arranged to operate alternately upon sheet material placed upon said cutting-table, first cutting said shoe-shanks from said material and subsequently forming said shoe-shanks, and mechanism to remove the waste portions of said material from said cutting-table.

In testimony whereof I have hereunto set my hand in presence of two subscribing witnesses.

GEORGE O. JENKINS.

Witnesses:
 CHARLES S. GOODING,
 GEORGE A. TARBELL.